Feb. 29, 1944.  G. W. HOPKINS, JR  2,342,938
ANTIAIRCRAFT FIRE CONTROL SYSTEM
Filed Feb. 14, 1939  5 Sheets-Sheet 3
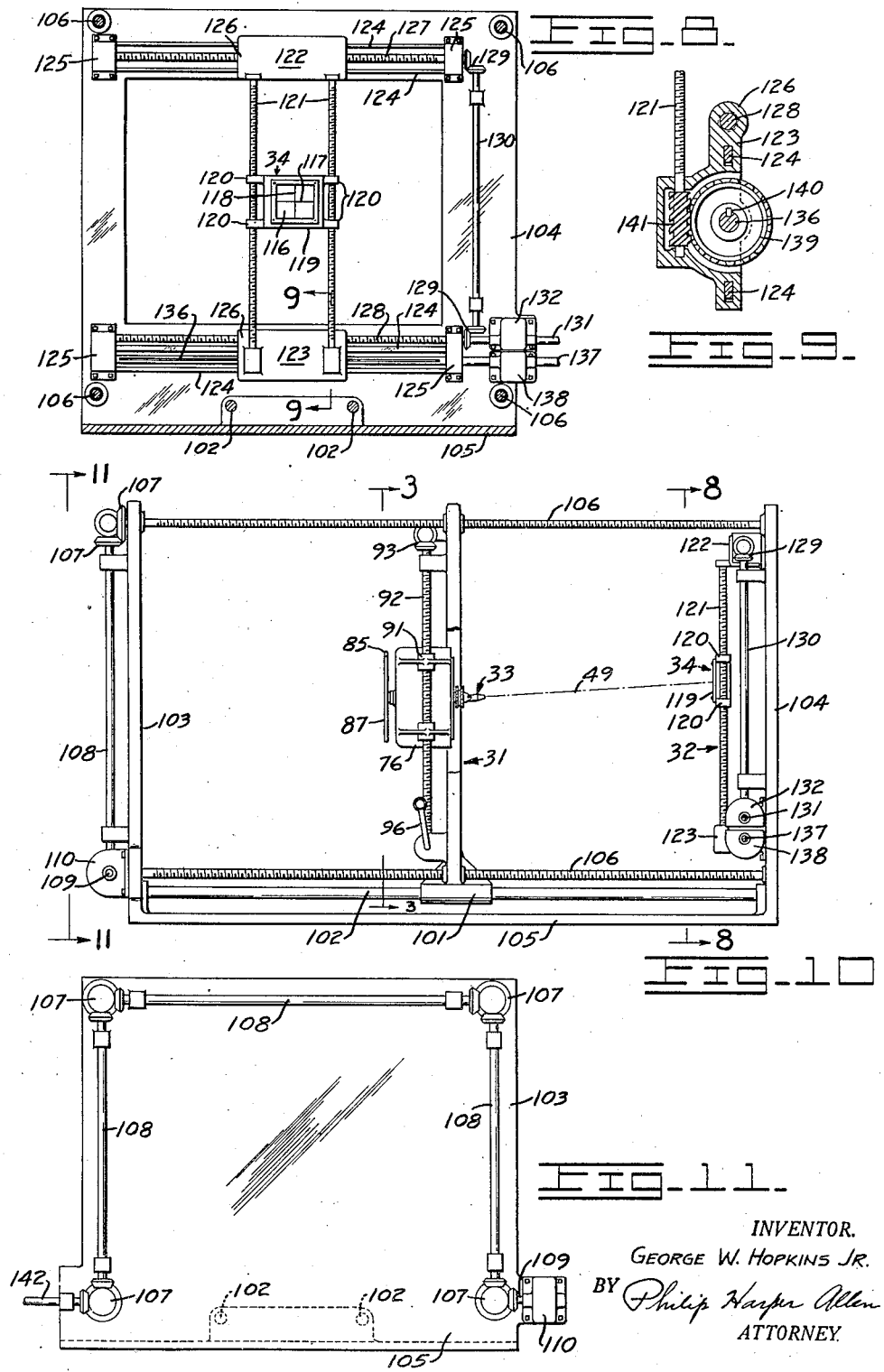
INVENTOR.
GEORGE W. HOPKINS JR.
BY Philip Harper Allen
ATTORNEY.

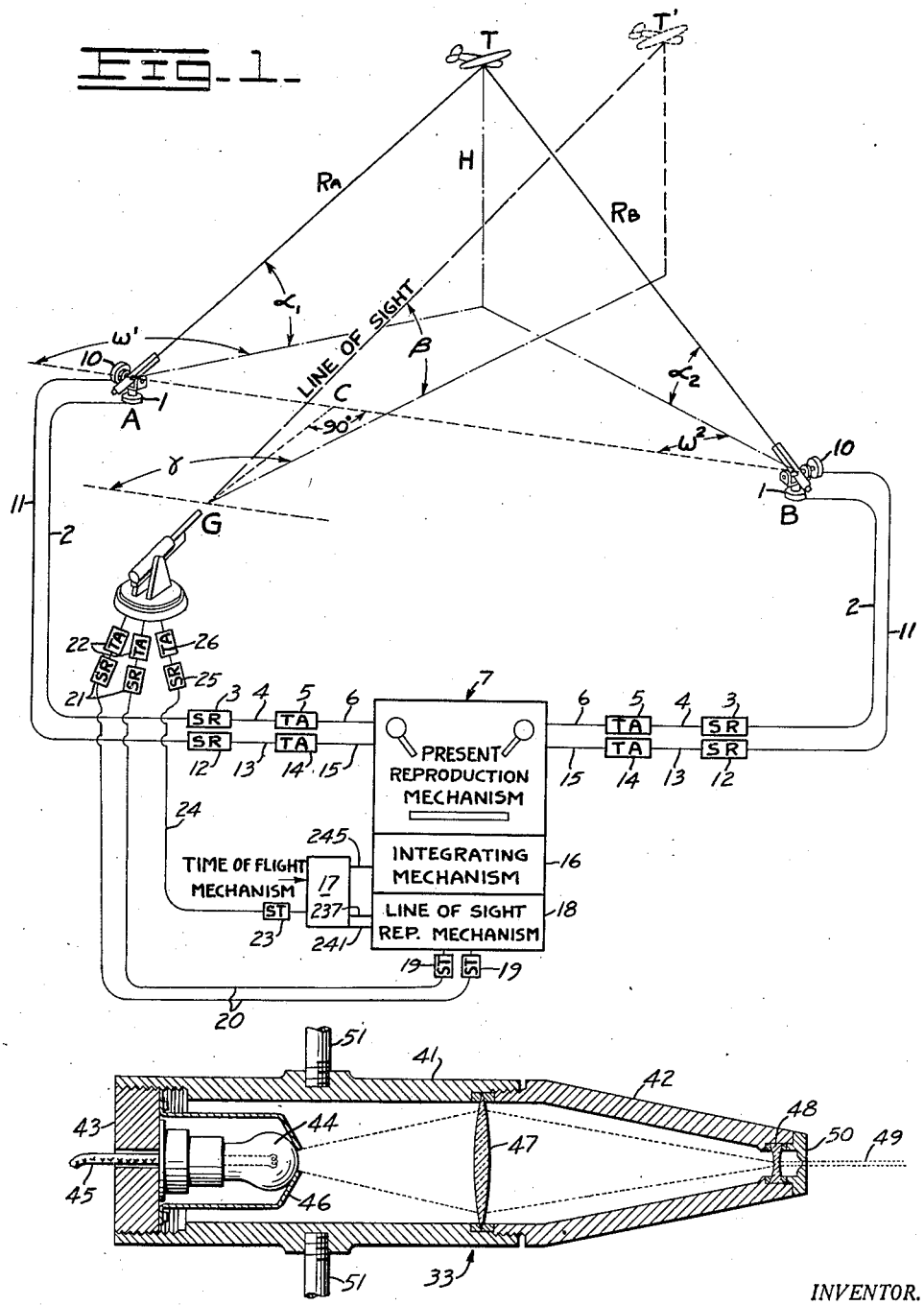

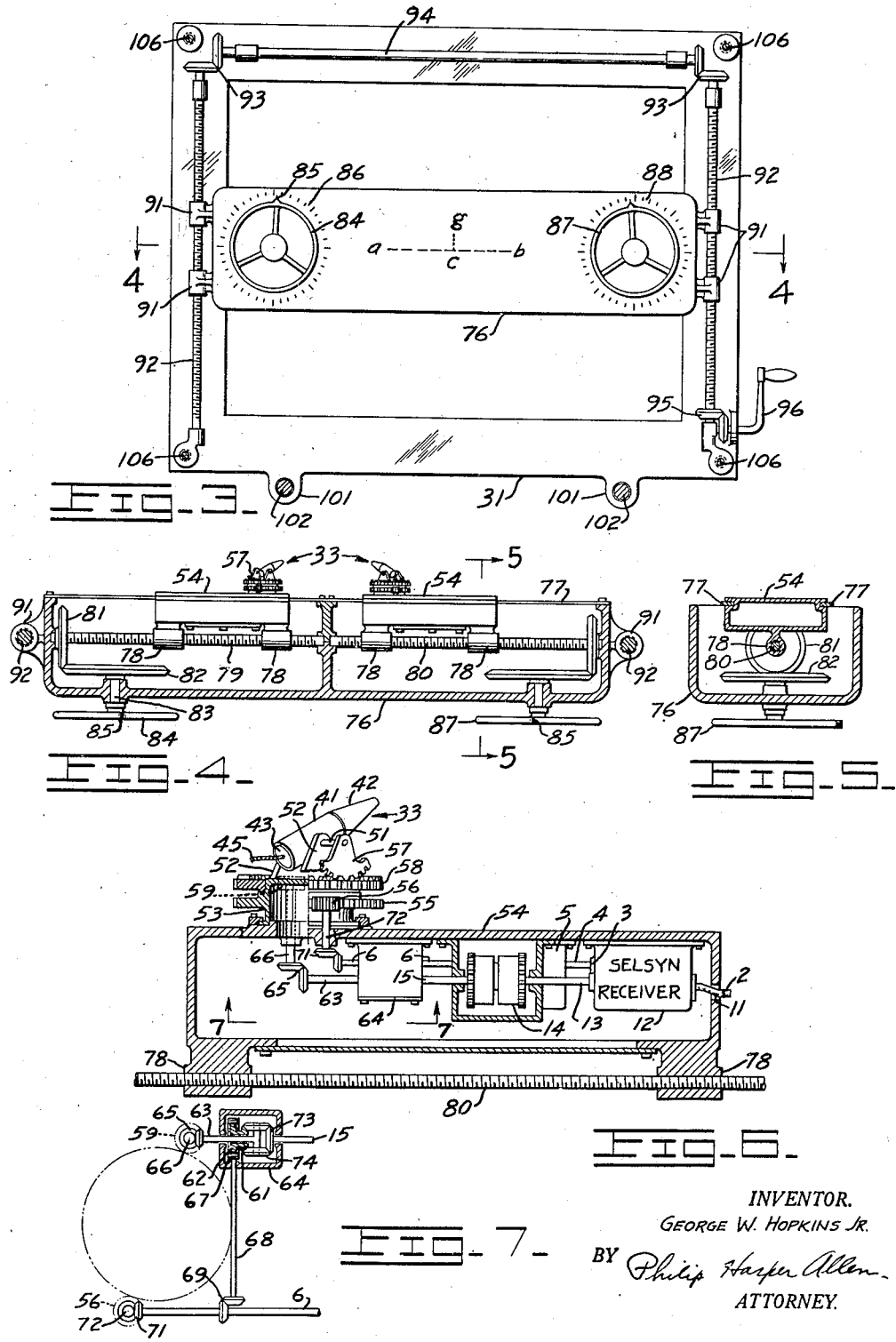

Feb. 29, 1944.  G. W. HOPKINS, JR  2,342,938
ANTIAIRCRAFT FIRE CONTROL SYSTEM
Filed Feb. 14, 1939  5 Sheets-Sheet 4

INVENTOR.
GEORGE W. HOPKINS JR.
BY Philip Harper Allen
ATTORNEY.

Feb. 29, 1944.  G. W. HOPKINS, JR  2,342,938
ANTIAIRCRAFT FIRE CONTROL SYSTEM
Filed Feb. 14, 1939  5 Sheets-Sheet 5

INVENTOR
GEORGE W. HOPKINS JR.
BY Philip Harper Allen
ATTORNEY.

Patented Feb. 29, 1944

2,342,938

UNITED STATES PATENT OFFICE 2,342,938

ANTIAIRCRAFT FIRE CONTROL SYSTEM

George W. Hopkins, Jr., San Leandro, Calif.

Application February 14, 1939, Serial No. 256,398

11 Claims. (Cl. 33—66)

This invention relates to anti-aircraft fire control and is concerned more particularly with means to continuously provide the correct data for laying anti-aircraft guns against an aerial target.

All instruments for this purpose with which I am familiar accomplish this end by the mechanical solution of mathematical formulae or by a method known as mechanical triangulation. A majority of the systems of the prior art require the measurement of one distance, either range or altitude, by direct observation of the target. The disadvantage of these systems is that it is not practical to accurately measure a distance continuously. Other systems deal entirely with angles and the disadvantage of these is that a future angle can not be determined from a present rate of angular change because the rate invariably changes during the time interval, which make a prediction, which is necessarily predicated on a constant rate of change, erroneous.

In accordance with my invention a device is provided to construct a mechanical reproduction of the observing telescopes, the gun and the target in their actual relative positions, but on a reduced scale. The movement of the target can then be observed and studied directly in the plane it is travelling. Its movements can be accurately measured and with the aid of simple well-known calculating mechanism its future position can be continuously determined and reproduced. From this data the element representing the gun can be made to actually take the position it must assume to fire upon this future point. In this manner the proper setting or future coordinates for the gun are directly measurable or transmittable to the gun itself. There is of course no lapse of time in the determination of this data. The process is instantaneous, and the output data which corresponds to the input data leaves the instrument simultaneously with the entrance of the latter.

It is the general object of my invention to provide an improved anti-aircraft fire control system.

It is a further object of my invention to provide an improved anti-aircraft fire control system in which the desired coordinates are obtained by reproducing in miniature the relation of the target, the observing stations and the gun.

It is a further object of my invention to provide an improved anti-aircraft fire control system in which the desired coordinates are obtained without measurement of any distance coordinate by direct observation of the target.

It is a further object of my invention to provide an improved anti-aircraft fire control system in which the future coordinates are obtained instantaneously.

It is a further object of my invention to provide an improved anti-aircraft fire control system in which correct firing data is obtained irrespective of whether the observing stations and the gun are located at the same ground elevation.

It is a further object of my invention to provide an improved anti-aircraft fire control system in which a minimum of mechanical calculation is necessary.

Other objects and advantages of my invention will be apparent from the following description thereof with reference to the accompanying drawings, in which Figure 1 is a diagrammatic view showing the relation of the observing stations, gun and target in a three-dimensional diagram, and also showing a diagram of the operative mechanisms of the fire control system in their relation to each other and to the stations, gun and target.

Figure 2 is a cross-section thru the axis of one of the telescope simulators of the reproduction mechanism.

Figure 3 is a sectional elevation of the carriage for the telescope simulators and a portion of the carriage adjusting mechanism. The view is indicated by the line 3—3 in Fig. 10.

Figure 4 is a sectional plan of the mechanism shown in Fig. 3 as indicated by the line 4—4 therein.

Figure 5 is a sectional view indicated by line 5—5 in Fig. 4, certain parts being omitted.

Figure 6 is a sectional view, partly in elevation, of the projector or telescope simulator carriage.

Figure 7 is a sectional elevation of a part of the drive for a telescope simulator and is indicated generally by the line 7—7 in Fig. 6.

Figure 8 is a sectional elevation of the target simulator mechanism of the present reproduction mechanism, the view being indicated by line 8—8 in Fig. 10.

Figure 9 is a sectional view indicated by the line 9—9 in Fig. 8.

Figure 10 is a side elevation of the present reproduction mechanism.

Figure 11 is an end elevation of the present reproduction mechanism and is indicated by the line 11—11 in Fig. 10.

Description of mechanism

Figure 13:
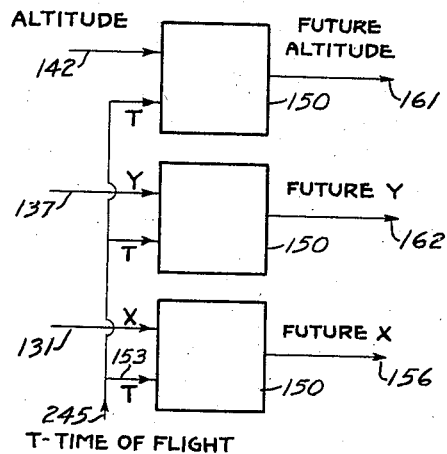
Figure 13 is a schematic view of the intergrating mechanism.

As stated, the fire control system of my invention contemplates the provision of apparatus for reproducing or simulating in miniature the relative positions of the observing stations, and the target to locate the present position of the airplane, and from this data the future or predicted situation is also reproduced in miniature, so that the firing data can be obtained from the position of the gun simulator.

The apparatus generally comprises three mechanisms, namely, means enabling the reproduction of the present or instant situation, a calculating mechanism which from the present coordinates of the target predicts the future coordinates, and means enabling the reproduction of the future situation, the element representing the target taking up a position in accordance with the future coordinates which have been determined.

In the present reproduction mechanism, my system utilizes two observing telescopes which are placed at any points advantageous without concern as to their position relative to the gun and the fire control instrument. These telescopes need not be in the same line as the gun as is so commonly required in other systems. Obviously they should be placed as far apart as is practical to make the target angle, that is, the angle between the two lines of sight at the target, as large as possible.

These elements are shown schematically in Fig. 1 which pictures the situation as it exists in the field. The two telescope observing stations are shown at A and B, the gun is at G and the target at T. In adjusting the line of sight $R_A$ of telescope A on the target it has been swung through angle of train $\omega_1$, and elevated through the angle $\alpha_1$. Similarly the coordinates of the line of sight $R_B$ are $\omega_2$ and $\alpha_2$. These four coordinates definitely locate the target in its present position, neither range ($R_A$, $R_B$) or the altitude (H) being necessary to determine its position in space relative to the baseline AB. The problem is to adjust the gun G at the present instant so that its projectile will arrive at the point T' at the same time that the airplane does. It will take the projectile a certain time to go from G to T', and this time of flight depends on the distance GT' and the elevation. During this time the airplane will be moving from T to T', it being of course necessary to assume that the airplane pursues a straight line course during the time that the projectile is travelling to meet it.

The first step will be to reconstruct the situation represented by the triangle ABT. The second step will be to determine T' from T. The third step will be to reconstruct the line GT'. Before passing to a description of the mechanism note that GC is perpendicular to AB. This relation will be used in adjusting points A and B in the instrument by positioning the line AB a distance GC from imaginary point G, B a distance BC from C, and A a distance AC from C. It will be noted that the three points, whether in the same horizontal plane or not, define a plane with respect to which the various measurements are made so that locating the points at the same altitude is not essential as long as their related positions are known and the position of the reference plane established.

General description

The telescopes or sight devices A and B (Fig. 1) at the observing stations are of conventional construction, and each telescope is rotatable about a vertical axis for training and about a horizontal axis for elevating in sighting a target. Each telescope in rotating about its vertical axis for training operates through a suitable direct mechanical connection the armature of a conventional Selsyn transmitter 1 which is electrically connected by cable 2 with a conventional Selsyn receiver 3, whose armature continuously and automatically assumes the same angular position as the armature in the transmitter to follow the movement of the telescope about its vertical axis. The armature of receiver 3 is connected by shaft 4 with a servo-motor or torque amplifier 5 of conventional construction, and the amplifier 5 is in turn connected by shaft 6 to the telescope's counterpart or simulator in reproduction mechanism 7 as described hereinafter. Similarly, the gearing which elevates telescope B, for example, is connected mechanically to Selsyn transmitter 10 which is electrically connected by cable 11 to Selsyn receiver 12 having shaft connection 13 with torque amplifier 14, which is connected by shaft 15 with reproduction mechanism 7.

Reproduction mechanism 7 serves in a manner later described to provide three instantaneous coordinates of the position of target T which are transmitted to integrating mechanism 16, where they are combined with the time of flight from time of flight mechanism 17 to obtain future values of these coordinates. These future values are transmitted to the future or line of sight reproduction mechanism 18, where they are utilized to mechanically reproduce the line of sight from G to T'. Line of sight reproduction mechanism 18 operates thru respective Selsyn transmitters 19, cables 20, Selsyn receivers 21, and torque amplifiers 22 to train and elevate gun G, and thru Selsyn transmitter 23, cable 24, Selsyn receiver 25, and torque amplifier 26 to transmit the time of flight to the fuse setter at the gun.

Present reproduction mechanism (Figs. 2–12)

The present reproduction mechanism comprises generally a pair of telescope simulators or false telescopes which are mounted in a ground frame representing the ground or reference plane in which the two observing stations and the gun are located, and a present target simulator or false target which is mounted for movement in a target frame representing a plane parallel to the ground plane. The two frames and the simulators are mounted for relative movement to reproduce in miniature the space relationship of the observing telescopes and the target. The relative movement of the telescope or sight device simulators in their plane provides for initial adjustment thereof to positions corresponding to observing stations A and B in their relative positions with respect to fixed points C and G.

Figure 12:
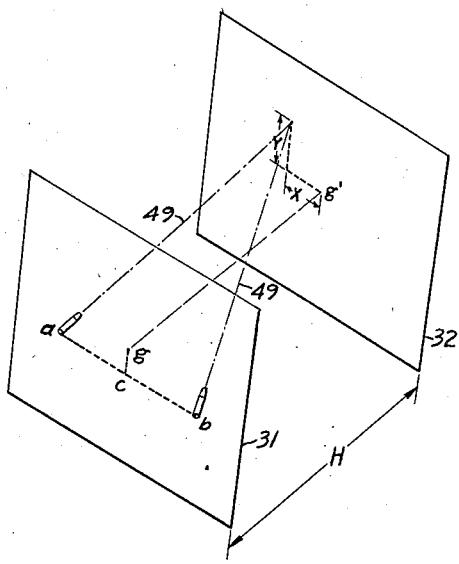
Figure 12 is a schematic perspective view illustrating the relation of the telescope and target simulators.

The reference and target planes are shown diagrammatically in Fig. 12, and for convenience the reference and target planes (frames 31 and 32) are represented as being upright (as they are reproduced in the mechanism) with their distance apart representing H, the altitude of the target, and the position of the target simulator away from g' (the projection of g) in its plane as represented by X and Y providing a reading of the other two coordinates which are required. If desired, the frames 31 and 32 may be disposed horizontally, or in any other desired relation. The telescope simulators 33 (Figs. 4 and 10) are shown as light projectors, while the target simulator 34 (Figs. 8 and 10) is represented by crossed lines on a screen, and these elements and their mounting will now be described.

*Telescope simulator.*—A telescope simulator is provided in the form of light projector 33 (Fig. 2) for emitting a small pencil of parallel rays which will appear as a dot when intercepted by a screen. One of the light projectors is shown in cross section in Fig. 2 and comprises cylindrical casing 41 provided with conical tip 42 threaded therein. In the center of cap 43 for casing 41 electric light bulb 44 is mounted having cord 45 extending thru the cap to a suitable source of electric current. Guard 46 is mounted about bulb 44 to cut off all light rays that will not fall on the face of lens 47 which is suitably mounted between casing 41 and tip 42. Lens 47 picks up the rays that pass therethrough and converges them upon small lens 48 which straightens out the rays, emitting a fine pencil 49 of parallel rays through the central aperture in tip 50 in which lens 48 is mounted.

Casing 41 of projector 33 (Figs. 2 and 6) has trunnions 51 journalled in upright supports 52 on rotatable base 53 suitably journalled on projector carriage 54 and has integral spur gear 55. Gear 55 is in engagement with gear 56 which is connected to the train receiver as later described. To move the projector in elevation, one of trunnions 51 carries a sector 57 meshing with a ring gear 58 having teeth in its upper and also in its outer face. The latter are in engagement with the gear 59 which is connected to the elevate receiver in a manner to be described presently.

A compensating differential is necessary to prevent elevation during train. This is diagrammatically shown in Fig. 7. One side of differential 61 is integral with worm wheel 62, both being loose on the shaft 63 which extends through casing 64 and is connected by bevel gearing 65 with shaft 66 carrying gear 59. Worm 67 is driven by shaft 68 which through bevel gearing 69 is driven from train shaft 6 also connected by bevel gearing 71 with shaft 72 carrying gear 56. The other side of differential 73 is on shaft 15 of the elevate receiver. Jockey gears 74 of the differential are carried by shaft 63. Thus, if train shaft 6 (Fig. 6) is rotated both gears 58 and 55 will be rotated in unison but in opposite directions. Gear 58 which is carried by gear 55 in effect remains stationary so that the movement of gear 55 is effective to train the projector but not to elevate it. When the elevate shaft 15 is rotated only the gear 58 is rotated to elevate the projector.

In this manner the projector 33 will move simultaneously and automatically just as the telescope to which it is connected moves. It is to be noticed at this time that the projector has been mounted on one side of carriage 54 while its actuating mechanism including the receivers and amplifiers are located on the opposite side of the carriage. This carriage and its mechanism is adapted to be located in the device to correspond to the position of the telescope observing station as will be explained later on.

*Telephone simulator mounting.*—The mechanism shown in Fig. 6 will be designated as a projector carriage. There are two of these, one for each telescope. They are exactly the same except that one carriage has the projector arranged on the right end of the base plate and the other has its projector on the left as in Fig. 4. It will now be explained how these two carriages are mounted so that they may be adjusted relative to each other and the gun in accordance with the conditions shown in Fig. 1.

The two projector carriages 54 (Figs. 4–6) are mounted for endwise sliding movement in a frame carriage 76 as shown in Figs. 4 and 5 by means of spaced guides 77 extending between the ends of frame carriage 76 and engaging channels in the respective side walls of the carriage as shown in Fig. 5.

The base of each projector carriage 54 (Figs. 4, 5, and 6) is provided with two apertured lugs 78 which are threaded to engage aligned screw shafts 79 and 80 journalled freely in suitable bosses of frame carriage 76. Keyed to screw shaft 79 (Fig. 4) is a bevel gear 81 which meshes with a large bevel gear 82 on the end of a stub shaft 83 in the front wall of frame carriage 76. This stub shaft carries an operating handle or wheel 84 having pointer 85 thereon. By rotating the wheel 84 (Figs. 3 and 4) the left hand carriage 54 can be slid to the right or left until the projector $a$ is a distance $ac$ from the center line. The distance $ac$ (Fig. 3) can be indicated by the pointer 85 on a suitable scale 86 provided on the frame carriage 76. In the same manner by rotating handle 87 the right hand carriage 54 can be adjusted until the projector $b$ is at the proper distance $bc$, as indicated on scale 88. The distances $ac$ and $bc$ noted above are proportional to and therefore simulate the lines AC and BC as illustrated in Fig. 1.

Frame carriage 76 (Figs. 3 and 4) is mounted for adjustment at right angles to the direction of adjustment of carriages 54 thereon, and for the purpose is provided with threaded lugs 91 in which are threaded screw shafts 92 for adjusting the frame carriage 76 for the distance $gc$. Shafts 92 are suitably journalled at opposite sides of frame 31 and connected at their upper ends by bevel gearing 93 and shaft 94. One of shafts 92 is connected by bevel gearing 95 with crank 96 which is turned to adjust the frame carriage 76 in accordance with the distance $gc$.

The projector mounting as arranged in the device appears as in Fig. 3, viewed from the front. Hand wheels 84 and 87 and crank 96 are readily accessible for adjusting the distances $ac$, $bc$ and $gc$. In this way the center $c$ of the frame carriage 76 is adjusted the proper distance $gc$ from an imaginary point $g$ which represents the location of the gun and is at a central point, which will be referred to later.

It will now be apparent that two fine pencils of light 49 (Fig. 12) will be produced which in every respect represent the two lines of sight $R_A$ and $R_B$ (Fig. 1). The target is at the intersection of these two lines 49 (Fig. 12), so that in order to arrive at the location of this point it is necessary to provide mechanism which will locate the point where the two pencils of light intersect. For this purpose I provide a movable screen which moves in a fixed plane, so that the projector mechanism moves toward or from the screen, rather than the reverse. The frame 31 (Fig. 10) and the frame carriage 76 are arranged to be moved at right angles to the plane of the adjusting shafts therefor.

Before proceeding with the explanation of the operation of this mechanism the manner in which the projector mechanism is moved to and from the screen mechanism will now be disclosed. Referring to Figs. 3 and 10, rectangular frame 31 is provided at its lower side with a pair of spaced bosses 101 slidably engaged with guide rods 102 extending between end plates 103, 104 of main frame 105. Adjacent its four corners frame 31 is threaded to receive four screw shafts 106 journalled in end plates 103, 104 which project through plate 103 and are provided with bevel gears 107 (Fig. 11) for connection with shafts 108 so that they may be equally driven. One of gears 107 is connected to shaft 109 of a motor 110, which is controlled to adjust frame 31 in a manner presently described.

*Present target simulator.*—Referring to Figs. 8 and 9, the target simulator comprises screen 116 preferably of translucent material and provided with cross-hairs 117, 118 and mounted in screen frame 119. Screen frame 119 is adjustably mounted by means of threaded lugs 120 on screw shafts 121, which are supported in screen frame carriers 122, 123. Rotation of the shafts 121 will cause the screen 116 to be moved vertically up or down. Carriers 122, 123 are mounted for endwise sliding movement on guides 124 extending between brackets 125 on end plate 104, and have threaded bosses 126 to receive screw shafts 127, 128, which are connected by bevel gearing 129 and shaft 130 for simultaneous movement. Shaft 128 is in turn connected to shaft 131 of electric motor 132. This motor will rotate 127 and 128 simultaneously and equally to move carriers 122 and 123 to and fro.

The shafts 121 which move the target simulator vertically are driven from the shaft 136 which is suitably connected to shaft 137 of the motor 138. This is effected by the mechanism best shown in Fig. 9. The shaft 136 has a spline or groove throughout its length, and mounted on the shaft 136 is a worm wheel 139 which has a lug 140 which cooperates with the groove. The worm wheel 139 is constrained to shift with the carrier 123 but is permitted to rotate with the shaft 136. The worm wheel 139 engages a worm 141 on the shaft 121. There are two such arrangements, one for each shaft 121.

It will now be apparent that the screen can be adjusted vertically and laterally by controlling the motors 132 and 138 (Fig. 8).

The screw shafts 106, 127 and 128 (Fig. 8) are supported in end plate 104 which is centrally apertured leaving a free view of the play of the light rays from the right of Fig. 10. The imaginary point g (on carriage 76 Fig. 12) mentioned before is aligned with the center of the square aperture in the supporting plate 104 shown in Fig. 8, as indicated in Fig. 12 by g' representing the projection of g on the plane 32. By the above arrangement the movement of the intersection of cross hairs 117 and 118 away from this point will give two coordinates of the target with respect to the gun, while the distance of frame 31 from the screen will give the third.

The mechanism so far described constitutes the first step, namely, the reconstruction of the relation between the telescopes, the gun and the target in its present position. It is operated as follows: Projectors a and b (Figs. 3 and 4) are adjusted relative to the point c by means of hand wheels 84 and 87, and relative to the point g by the crank 96. The projectors being adjusted, they are put in operation, their bulbs lighted and their beams adjusted to reproduce the lines of sight as described. Three operators are stationed back of the screen in Fig. 8. One operates a suitable control rheostat (not shown) for controlling the direction and speed of rotation of the motor 110 which moves the projector mechanism toward and away from the screen. Another controls the rheostat for motor 138 and the third controls the rheostat for motor 132. The operators will be designated Nos. 1, 2 and 3, respectively.

The screen is adjusted to pick up the two spots of light, then No. 1 controls motor 110 to adjust frame 31 so as to bring the spots together until they appear as one spot and to keep them continuously in this coincident relation. The screen is now at the intersection of the beams of light and the distance of the frame 31 from the frame 34 (Fig. 10) represents the height of the target from the ground. The value of the altitude therefore appears and continues to appear as the angular displacement of the shaft 142. (Fig. 11) which is connected thru shafts 108 and gears 107 to motor shaft 109.

No. 2 controls motor 138 to keep the spot on horizontal cross-hair 117 of the screen whereby the angular displacement of the shaft 137 continuously represents what may be termed the Y coordinate (Fig. 12) of the target relative to the gun. No. 3 controls motor 132 to keep the spot on vertical cross-hair 118 of the screen, whereby the angular displacement of the shaft 131 represents the X coordinate of the target relative to the gun.

*Integrating mechanism*

Figure 14:
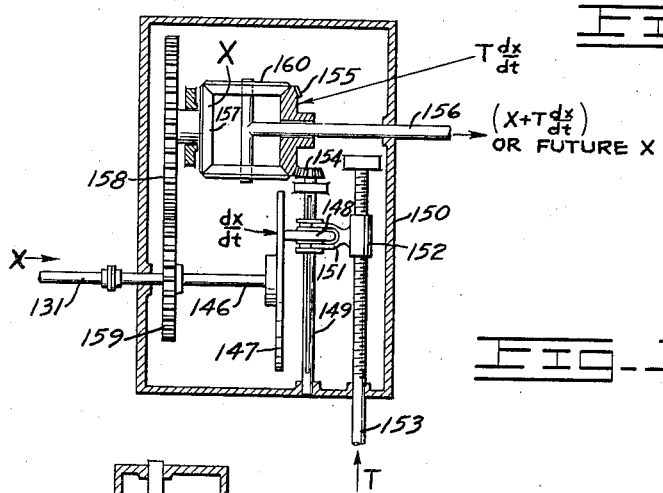
Figure 14 is an elevational section of one of the integrating means.

The displacement of the shafts 142, 131 and 137 represent the instantaneous values of altitude H, X and Y coordinates as explained above. Also their rate of rotation represent the rate at which these three coordinates are changing namely $dH/dt$, $dX/dt$ and $dY/dt$. Each of these shafts is connected to an integrating device, as shown diagrammatically in Figs. 13 and 14. These devices are mechanical duplicates and only one will be described.

Shaft 131 (Fig. 14) representing X is connected to a shaft 146 which carries a friction disc 147. In contact with this disc is a friction wheel 148 which is splined on a shaft 149 suitably supported in housing 150. Wheel 148 is shiftable on shaft 149 by means of a yoke 151 which is integral with a nut 152 threaded on a screw shaft 153 which is rotated according to the value of the time of flight of the projectile. This value is determined by means later described and is fed back to shafts 153 of the integrators as will be described. Thus, disc 147 rotates proportionally to the value of $dX/dt$, and wheel 148 is displaced proportionally to the time of flight T, so that the resultant movement of shaft 149 represents $$\frac{TdX}{dt}$$

Shaft 149 carries a bevel gear 154 in mesh with another bevel gear 155 which is loose on the shaft 156 and forms one side of a differential.

The other side of the differential is the bevel gear 157 which is connected to the spur gear 158 meshing with spur gear 159 fast on the shaft 146. The jockey gears 160 are mounted as usual on the end of the shaft 156 to transmit thereto the combined movements of bevel gears 155 and 157 so that the displacement of shaft 156 represents the value $$X + \frac{TdX}{dt}$$

or the future value of X. In the same manner the shafts 161 and 162 (Fig. 13) represent the future altitude H and the future Y.

*Line of sight reproduction mechanism*

The future values of X, Y and H are utilized to produce in miniature the relation between the future target position and the gun by positioning a future target simulator in the future target position and sighting a gun simulator on this position, and this is effected with reference to the scaled relation and the relative positions of the parts of the present reproduction mechanism described above. Preferably, the position of the gun simulator is controlled directly by the future target simulator.

*Future target simulator.*—The shaft 161 (Fig. 16) for future altitude is connected to one of four vertical shafts 166 which are supported in frame 167 and are connected together by means of shafts 168 and bevel gearing 169 for equal movement. Threaded on the screw shafts 166 are four supporting lugs 170 (Figs. 16 and 17) of a target simulator carriage 171, which represents the plane above the ground parallel to the reference plane, that the target will be in and its position therefore represents the future altitude.

Figure 16:
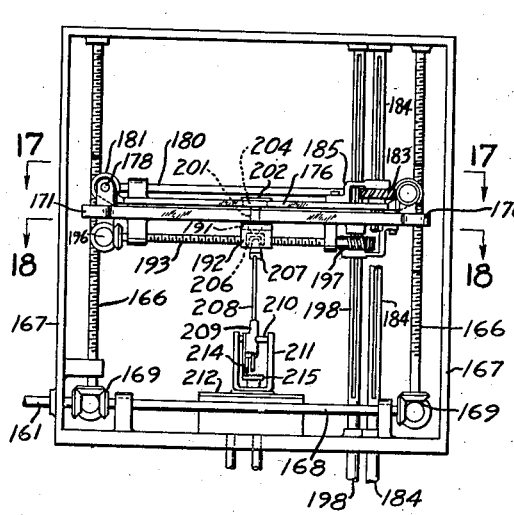
Figure 16 is an elevational view of the line of sight reproduction mechanism.
Figure 17:
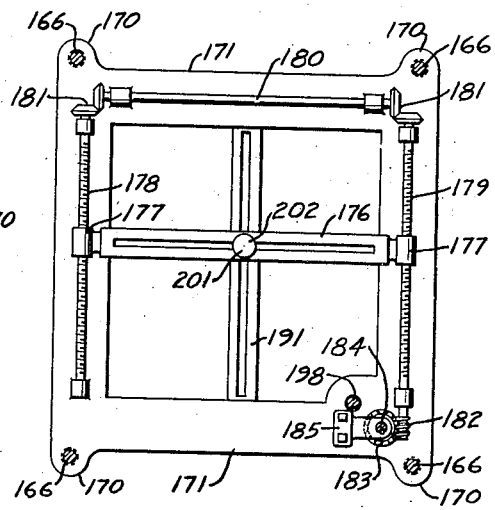
Figure 17 is a sectional plan view as indicated by the line 17—17 in Fig. 16.

Mechanism is mounted on the top of carriage 171 as shown in Fig. 17 for adjusting the target simulator in accordance with its coordinate Y, and this mechanism includes slotted bar 176 having bosses 177 at its ends threaded to receive screw shafts 178 and 179 which are journalled on carriage 171 and are connected together by the shaft 180 and bevel gearing 181. The screw shaft 179 carries a worm 182 (Figs. 16 and 17) which engages a worm wheel 183 splined on a shaft 184, which extends vertically between the top and bottom walls of frame 167. A keeper 185 is provided on carriage 171 for the worm wheel 183. The shaft 184 is connected to the shaft 162 by mechanism not shown so that the shafts 184, 179, 180 and 178 are rotated in accordance with the future Y coordinate. The bar 176 is therefore translated a distance Y from its initial position.

On the under side of the carriage 171 (Figs. 16 and 18) similar mechanism is provided for adjusting the future target simulator in accordance with its X coordinate. This mechanism comprises a slotted bar 191 arranged perpendicular to the bar 176. Bosses 192 (Fig. 18) at the ends of the bar 191 are threaded to receive screw shafts 193 and 194 which are interconnected by shaft 195 and gearing 196. Shaft 193 has a worm and worm wheel connection 197 with splined shaft 198 which is slidably engaged by the worm wheel of the connection 197, and shaft 198 is suitably connected to shaft 156 (Fig. 13) for the future X coordinate so that the bar 191 is moved accordingly.

Figure 19:
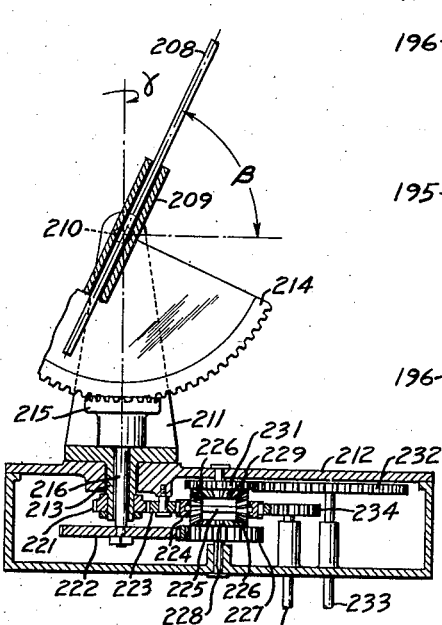
Figure 19 is a sectional view of the gun simulator.
Figure 20:
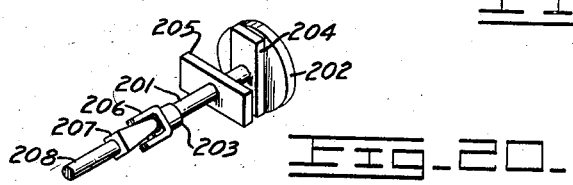
Figure 20 is a detailed perspective of the target simulator of the line of sight reproduction mechanism.

Engaging both bars 176 and 191 (Figs. 16–18) at their intersection is a future target simulator in the form of pin 201 shown in detail in Fig. 20. Pin 201 is provided with a cap 202 and a shoulder 203 to maintain it in engagement with the top and bottom of the slotted bars, and has keys 204, 205 disposed at right angles to each other to engage in the slots of respective bars 176 and 191. The lower end of the pin is provided with a fork 206 journalled thereon to form a universal connection with fork 207 journalled at the end of a long rod 208 (Figs. 16, 19 and 20) which provides a controlling connection from the future target simulator to the gun simulator, which will now be described.

*Gun simulator.*—Rod 208 (Figs. 16 and 19) represent the line of sight GT' (Fig. 1) from the gun to the future target position. The rod 208 is adapted to slide in a gun simulator in the form of cylinder 209 which is pivoted by trunnions 210 in a forked support 211 journalled on casing 212 and having hollow vertical shaft 213 extending into the casing. The gun simulator, therefore, is mounted for movement in both train and elevation under the control of line of sight rod 208.

To provide an indication of the elevation of the gun simulator one of trunnions 210 (Fig. 19) carries a sector 214 for movement with cylinder 209 and which meshes with crown gear 215 on vertical shaft 216 which passes through shaft 213. Shafts 213 and 216 are provided with respective spur gears 221 and 222 at their lower ends which are connected to a differential to provide the future train and future elevation for the gun. Gear 221 is connected through idler 223 to ring gear 224 which supports shaft 225 for two bevel gears 226 forming the jockey element of the differential. Gear 222 is connected to a gear 227 integral with bevel gear 228 forming one side of the differential. The other side 229 of the differential is integral with spur gear 231 which meshes with gear 232 on shaft 233 which is rotated in accordance with the future azimuth. The ring gear 224 also engages gear 234 on shaft 235, which is rotated in accordance with the future elevation.

Slotted bars 176 and 191 in adjusting the upper end of rod 208 cause cylinder 209 to be rotated around its horizontal axis 210 and also about the vertical axis which is the center line of shafts 213 and 216. Cylinder 209 thereby assumes the position of the gun and is mounted in the same way as the gun. The motion about the vertical axis is indicated by the rotation of shaft 213 having the fork 211 and the motion about the horizontal axis (the trunnions) is indicated by the rotation of the sector 214. These angular motions are $\gamma$ and $\beta$ (Figs. 1 and 19), the angles of train and elevation for the gun. However, when the device rotates about the vertical axis, sector 214 causes gear 215 and shaft 216 to rotate through the angle $\gamma$, as well as thru the angle $\beta$. The motion of shaft 216 is therefore $\beta+\gamma$ and the motion of shaft 213 is $\gamma$ which is subtracted from $\beta+\gamma$ to obtain $\beta$; $\gamma$ appearing on shaft 233 and $\beta$ on shaft 235. These shafts operate Selsyn transmitters 19 (Fig. 1) which are electrically connected to receivers 21 at the gun which through servo motors or torque amplifiers 22 automatically set the gun. It will be understood of course that the data for setting the gun are obtained relative to the reference plane of the observing stations and the gun whether this be horizontal or displaced from the horizontal. In the latter case, if desired, the data can be reoriented with reference to a horizontal plane by appropriately displacing the stators of the Selsyn transmitters.

Figure 15:
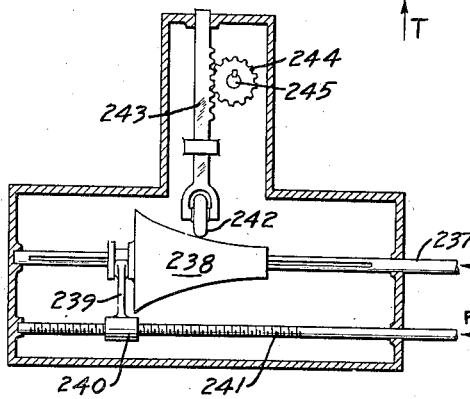
Figure 15 is a sectional elevation of the time of flight mechanism.

*Time of flight.*—Shaft 235 (Fig. 19) representing the future elevation is also connected to the time of flight mechanism (Fig. 15) to drive shaft 237 thereof. Splined on the shaft 237 is a conoid 238 which is rotated thereby in accordance with future elevation. The conoid is shifted endwise on shaft 237 by a yoke 239 on a nut 240 threaded on shaft 241 which is driven from shaft 161 (Fig. 13) which represents future altitude. In this manner conoid 238 is shifted according to the future altitude and rotated according to the future angle of elevation. Riding on the surface of the conoid is a roller 242 of a rack bar 243 which actuates a pinion 244 on shaft 245. The contour of the conoid is designed to shift the rack an amount equal to the future time of flight which is a function of the future elevation and future altitude which adjust the conoid. Shaft 245 operates through a Selsyn transmitter 23 (Fig. 1), Selsyn repeater 25 and torque amplifier 26 to transmit the time of flight to the fuse setter at the gun. Shaft 245 is also connected back to the shafts 153 of the integrators in Fig. 13 supplying the proper time factor for determining the increments of change in the three coordinates.

This system will instantaneously and continuously provide the proper data for firing the gun, determined from the movements of the telescopes in following the target. It will of course be necessary to apply such corrections as drift, tenuity, temperature, pressure, etc., and such corrections can conveniently be applied at the Selsyn transmitters by displacing the stators the required amounts as is well known. Mechanism for this purpose is old and forms no part of this invention.

Operation

To set the system for operation, the crank 96 (Fig. 3) is turned to move frame carriage 76 a distance *gc* proportional to GC (Fig. 1) and hand wheels 84 and 87 (Fig. 3) are turned to move the respective projector carriages 54 so that they are spaced distances *ac* and *bc*, respectively, proportional to distances AC and BC of the telescopes A and B (Fig. 1) from point C. After this initial setting, the lights in projectors 33 are turned on, and the projectors 33 being positioned by the telescopes A and B will project onto the screen 116 as shown in Fig. 12. Operator No. 1 then controls motor 110 (Fig. 10) to move frame 31 until the dot images on screen 116 coincide, and in this way the frames 31 and 32 are spaced apart a distance H corresponding to the target altitude, and shaft 142 is displaced an amount proportional thereto. No. 2 operator simultaneously controls motor 138 (Fig. 8) to move screen 116 vertically to maintain the spot of light on horizontal cross-hair 117, while No. 3 operator controls motor 132 to move screen 116 laterally and keep the spot on vertical cross-hair 118. In this way, shafts 137 and 131, respectively, are displaced to represent the Y and X coordinates of the target as illustrated in Fig. 12.

It is seen, therefore, that the present target simulator, i. e., the intersection of hairs 117 and 118 on screen 116, is adjusted under control of the observing telescopes, and motors 110, 132 and 138 to the present target position in the miniature space relationship, and that in so doing the shafts 142, 131 and 137 are displaced proportionally to the H, X and Y coordinates of this position. The movements of shafts 131, 137, and 142 (Fig. 13) are combined with the time of flight in respective integrating mechanisms 150 to drive respective shafts 156, 162 and 161 in accordance with the future values of X, Y, and H for use in constructing the future position of the target with respect to the gun.

Figure 18:
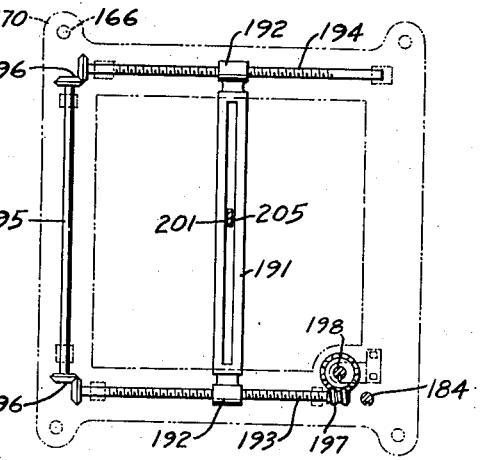
Figure 18 is a sectional plan view as indicated by the line 18—18 in Fig. 16.

As shown in Figs. 16–18, shaft 161 positions carriage 171 vertically with respect to gun simulator 209, while shafts 184, 198, driven from shafts 156 and 162, respectively, position future target simulator 201 in accordance with the future Y and X coordinates therefor. The movement of future target simulator 201 (Figs. 16 and 19) is followed by gun simulator 209 under control of line of sight rod 208, so that the movement of simulator 209 in train and elevation can be used to set the gun correspondingly.

It will be noted that the time of flight mechanism 17 is controlled by the future H and future elevation β. When the system is first placed in operation, i. e., before a prediction is made, these values correspond to present H and present elevation, so that the first prediction is based on a time of flight corresponding to these present values. However, any change in future H and β being instantaneously transmitted to the time of flight mechanism, results in a rapid, substantially instantaneous change of the time of flight until it actually corresponds to the future target position.

While I have shown and described my invention in connection with a preferred embodiment thereof, it is to be understood that the invention is capable of both variation and modification from the form shown without departing from its scope as defined in the claims appended hereto.

I, therefore, claim as my invention:

1. In an anti-aircraft fire control system having sight devices; means for reproducing in miniature the relation between said sight devices and a target, including sight device simulators, a present target simulator, and means for effecting relative movement between said target simulator and said sight device simulators to vary the space relationship therebetween; means controlled by said movement effecting means for predicting a future position of said target; and means for reproducing in miniature the relation between said future target position and a gun, including a future target simulator controlled by said predicting means, and a gun simulator controlled by said future target simulator.

2. In an anti-aircraft fire control system having sight devices; means for reproducing in miniature the relation between said sight devices and a target including means movable in accordance with the coordinates locating said target relative to a fixed reference; means controlled by said movable coordinate means for predicting future coordinates locating a future position of the target; and means controlled by said predicting means for reproducing in miniature the relation between said future target position and the gun including a gun simulator movable in azimuth and elevation to produce firing data for a gun.

3. In an anti-aircraft fire control system having sight devices and a gun; means controlled by said devices as they are directed upon a target for reproducing in miniature the relation between said sight devices and a target including a target simulating element and means movable in accordance with space coordinates locating said target simulating element relative to a fixed reference; means controlled by said movable coordinate means for predicting future coordinates locating a future position of the target; and means for producing firing data for the gun including means controlled by said predicting means for reproducing in miniature the space and angular relation between said future target position and the gun, said reproducing means including a future target simulator and a gun simulator; and time of flight mechanism controlled by said predicting mechanism for transmitting a movement proportional to the time of flight to said predicting mechanism and said gun.

4. In an anti-aircraft fire control system having sight devices; means for reproducing in miniature the relation between said sight devices and a target including means movable in accordance with coordinates locating said target relative to a fixed reference; means controlled by said movable coordinate means for predicting future coordinates locating a future position of the target; and time of flight mechanism controlled by said predicting mechanism for transmitting a movement proportional to the time of flight to said predicting mechanism.

5. In an anti-aircraft fire control system, means movable in accordance with coordinates locating said target relative to a fixed reference; means controlled by said movable coordinate means for predicting future coordinates locating a future position of the target; and time of flight mechanism controlled by said predicting mechanism in accordance with a future coordinate value for transmitting a movement proportional to the time of flight to said predicting mechanism.

6. In an anti-aircraft fire control system having sight devices bearing a predetermined to relation to a gun, means for reproducing in miniature the relation between said sight devices and a target, comprising spaced apart sight device simulators controlled by said sight devices to have corresponding movements, means for adjusting the spacing between said simulators, and means for adjusting said sight device simulators simultaneously with reference to a point representing the position of the gun relative to said sight devices, whereby to effect an initial scale setting of said sight device simulators to occupy relative positions corresponding to the relative positions of the sight devices with respect to each other and with respect to the gun.

7. In an anti-aircraft fire control system having sight devices, means for reproducing in miniature the relation between said sight devices and a target, comprising spaced apart parallel frames, adjusting means for varying the distance between said frames, sight device simulating means carried by one of said frames, target simulating means movable on the other of said frames, and means for adjusting one of said simulating means on the associated frame, whereby the relative adjustment of said frames and said simulating means cause said respective simulating means to occupy relative positions corresponding to the relative positions of the target and the sight devices.

8. In an anti-aircraft fire control system having sight devices, means for reproducing in miniature the relation between sight devices and a target, a frame representing the plane of the gun and the sight devices, sight device simulating means carried by said frame, a second frame representing the plane of the target, a screen movably mounted on said second frame, an indicium on said screen comprising a target simulator, adjusting means for varying the distance between said frames, a motor for driving said distance varying adjusting means, means for moving said screen in one direction on said frame, a second motor for driving said screen moving means, other means for moving said screen on said frame in a direction at a right angle to said one direction, and a third motor for driving said other moving means, whereby the movement of said motors affords three coordinate values defining the present location of said target.

9. In an anti-aircraft fire control system having sight devices, a target simulator comprising a translucent screen, means mounting said screen for movement in two directions at right angles to each other, a pair of intersecting lines on said screen extending in said two directions, a pair of sight device simulators for cooperation with said screen, means for adjusting said screen in said two directions to maintain said sight devices trained on said lines and means for effecting relative adjustment between said sight device simulators and said screen in a third direction to bring the point of coincidence of the lines of sight of said sight device simulators at the point of intersection of said pair of lines.

10. In an anti-aircraft fire control system having means for producing linear space coordinates of a target position with respect to a gun, a frame, a carriage mounted for movement on said frame according to one of said linear space coordinates, a target simulator mounted for movement on said carriage in accordance with others of said linear space coordinates, a gun simulator mounted on vertical and horizontal axes for training on said target simulator, and means movable by said target simulator for effecting said training movement of said gun simulator.

11. In an anti-aircraft fire control system employing an anti-aircraft director or predictor, a gun, and a pair of spaced target locators, a pair of sight device simulators spaced to scale in a plane representing the ground, means for turning each of said sight device simulators about two axes from said locators respectively, a screen spaced from said ground plane, means for adjusting the distance between said plane and said screen so that the lines of sight of said sight device simulators intersect on said screen, said distance representing the height of the target above the ground, and means to measure two additional linear coordinates of said point of intersection with respect to a point in said ground plane by effecting relative adjustment between said screen and said sight device simulators to locate the point of intersection of said line of sight at a predetermined position on said screen, whereby the three coordinates locating the present position of the target with respect to a point in the ground are obtained.

GEORGE W. HOPKINS, JR.